United States Patent
Murayama et al.

(10) Patent No.: US 7,638,212 B2
(45) Date of Patent: Dec. 29, 2009

(54) MAGNETIC RECORDING MEDIUM

(75) Inventors: Yuichiro Murayama, Kanagawa (JP); Hiroshi Hashimoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 337 days.

(21) Appl. No.: 11/353,106

(22) Filed: Feb. 14, 2006

(65) Prior Publication Data

US 2006/0194081 A1    Aug. 31, 2006

(30) Foreign Application Priority Data

Feb. 28, 2005    (JP) .............................. 2005-053414

(51) Int. Cl.
*G11B 5/716*    (2006.01)

(52) U.S. Cl. .................. 428/840.5; 428/838; 428/840.1
(58) Field of Classification Search .............. 428/840.5, 428/838
See application file for complete search history.

(56) References Cited

U.S. PATENT DOCUMENTS

| | | | | |
|---|---|---|---|---|
| 5,055,349 A | * | 10/1991 | Yasufuku et al. ............. | 428/323 |
| 5,264,513 A | * | 11/1993 | Ikemura et al. ............. | 526/318 |
| 7,056,607 B2 | * | 6/2006 | Zinbo et al. .............. | 428/840.2 |
| 2002/0094444 A1 | * | 7/2002 | Nakata et al. ................ | 428/480 |

FOREIGN PATENT DOCUMENTS

| | | |
|---|---|---|
| JP | 57-40747 A | 3/1982 |
| JP | 60-133531 A | 7/1985 |
| JP | 2001-84582 A | 3/2001 |
| JP | 2003-132522 A | 5/2003 |

* cited by examiner

*Primary Examiner*—D. Lawrence Tarazano
*Assistant Examiner*—Gary D. Harris
(74) *Attorney, Agent, or Firm*—Sughrue Mion, PLLC

(57) ABSTRACT

A magnetic recording medium is provided that comprises a non-magnetic support and, in order thereabove, a radiation-cured layer cured by exposing a layer comprising a radiation curing compound to radiation, and a magnetic layer comprising a ferromagnetic powder dispersed in a binder, the radiation curing compound having a radiation curing functional group in the molecule and being derived from a diisocyanate that has a branched structure but does not have a cyclic structure.

13 Claims, No Drawings

MAGNETIC RECORDING MEDIUM

BACKGROUND OF THE INVENTION

1. Field of the Invention

The present invention relates to a magnetic recording medium such as a magnetic tape or a magnetic disk.

2. Description of the Related Art

As tape-form magnetic recording media for audio, video, and computers, and disc-form magnetic recording media such as flexible discs, a magnetic recording medium has been used in which a magnetic layer having dispersed in a binder a ferromagnetic powder such as γ-iron oxide, Co-containing iron oxide, chromium oxide, or a ferromagnetic metal powder is provided on a support. With regard to the support of the magnetic recording medium, polyethylene terephthalate (PET), polyethylene naphthalate (PEN), etc. are generally used. Since these supports are drawn and are highly crystallized, their mechanical strength is high and their solvent resistance is excellent.

The magnetic layer, which is obtained by coating the support with a coating solution having the ferromagnetic powder dispersed in the binder, has a high degree of packing of the ferromagnetic powder, low elongation at break, and is brittle, and it is therefore easily destroyed by the application of mechanical force and might peel off from the support. In order to prevent this, an undercoat layer is provided on the support so as to make the magnetic layer adhere strongly to the support.

On the other hand, magnetic recording media are known in which a radiation-cured layer is formed using a compound having a functional group that is cured by radiation such as an electron beam, that is, a radiation curing compound. These radiation-cured layers formed from the radiation curing compound give a magnetic layer having insufficient smoothness, and adequate electromagnetic conversion characteristics cannot be obtained (ref. JP-A-60-133531, JP-A-57-40747, and JP-A-2001-84582; JP-A denotes a Japanese unexamined patent application publication). Furthermore, since the peel-off strength of the magnetic layer is insufficient, when such a magnetic recording medium is run repeatedly in a VTR, etc., a part of the magnetic layer peels off, thus giving rise to the problem of faults such as dropouts. Moreover, since the radiation-cured layer is soft, the problem of it sticking to guide rollers, etc. during a coating step, etc. often occurs.

Furthermore, a magnetic recording medium provided with a radiation-cured layer having a cyclic structure has been proposed (ref. JP-A-2003-132522). However, there is a desire for a further improvement in durability, particularly of a magnetic recording medium employing fine particles as a magnetic substance.

BRIEF SUMMARY OF THE INVENTION

It is an object of the present invention to provide a magnetic recording medium having excellent smoothness and electromagnetic conversion characteristics, excellent long-term storage stability, few faults and little of the magnetic layer coming off during web transport in a production process, and excellent productivity.

This object has been accomplished by the constitution of the present invention below. That is, the present invention comprises a non-magnetic support and, in order thereabove, a radiation-cured layer cured by exposing a layer comprising a radiation curing compound to radiation, and a magnetic layer comprising a ferromagnetic powder dispersed in a binder, the radiation curing compound having a radiation curing functional group in the molecule and being derived from a diisocyanate that has a branched structure but does not have a cyclic structure.

Furthermore, a non-magnetic layer comprising a non-magnetic powder dispersed in a binder can be provided between the radiation-cured layer and the magnetic layer.

BEST MODE FOR CARRYING OUT THE INVENTION

The present invention is explained further in detail below.

I. Radiation-Cured Layer

Radiation curing compound having a radiation curing functional group in the molecule and being derived from a diisocyanate having a branched structure but not a having cyclic structure.

The 'radiation curing compound having a radiation curing functional group in the molecule and being derived from a diisocyanate having a branched structure but not having a cyclic structure' (hereinafter, also called 'the radiation curing compound of the present invention') contained in the radiation-cured layer referred to in the present invention is a compound having the property of polymerizing or crosslinking when it is exposed to radiation such as ultraviolet rays or an electron beam and curing to become a macromolecule. The radiation curing compound does not react unless it is given external energy (ultraviolet rays or an electron beam). Because of this, a coating solution containing the radiation curing compound has a stable viscosity unless it is irradiated with ultraviolet rays or an electron beam, and a high coating smoothness can be obtained. Furthermore, since the reaction proceeds instantaneously by virtue of the high energy of ultraviolet rays or an electron beam, the coating solution containing the radiation curing compound can give a high coating strength.

Examples of the radiation used in the present invention include various types of radiation such as an electron beam (β rays), ultraviolet rays, X rays, γ rays, and α rays.

As the radiation curing compound of the present invention, for example, a urethane acrylate or urethane methacrylate compound employing a diisocyanate that has a branched side chain such as a methyl group as a branched structure but does not have a cyclic structure can be used.

Since the radiation curing compound of the present invention has a branched structure, little crystallization occurs compared with a straight chain aliphatic compound not having a branched structure, and the viscosity of the radiation curing compound can be reduced. As a result, leveling properties when coating are excellent, micro projections on the support can be buried, and a magnetic layer having excellent smoothness can be obtained, thus giving high electromagnetic conversion characteristics.

It is more preferable if the branched structure is a mixture of radiation curing compound isomers since the effect in lowering the viscosity is high. Specific examples thereof include a radiation curing compound obtained using a mixture of 2,4,4-trimethylhexamethylene diisocyanate and 2,2,4-trimethylhexamethylene diisocyanate as a diisocyanate, which will be described later.

The radiation curing compound of the present invention can be obtained by a method below.

(1) Reacting, with the above-mentioned diisocyanate, a compound having in the molecule a group that reacts with an isocyanate and a radiation curing functional group. (2) Reacting a terminal NCO polymer, obtained by a reaction between the above-mentioned diisocyanate and a diol, with a compound having in the molecule a group that reacts with an isocyanate (hydroxyl group) and a radiation curing functional group. (3) Reacting a terminal OH urethane prepolymer, obtained by a reaction between the above-mentioned diisocyanate and a diol, with a compound having in the molecule an NCO group and a radiation curing functional group.

Examples of the diisocyanate that can be used in the present invention include lysine diisocyanate methyl ester and trimethylhexamethylene diisocyanate.

Examples of the compound having a group that reacts with an isocyanate group and a radiation curing functional group that can be used in the present invention include 2-isocyanate ethyl acrylate and 2-isocyanate ethyl methacrylate. From the viewpoint of excellent curability, it is preferable to use 2-isocyanate ethyl acrylate.

Examples of the compound having a hydroxyl group and a radiation curing functional group are as follows. Specific examples thereof include 2-hydroxyethyl acrylate, 2-hydroxyethyl methacrylate, pentaerythritol triacrylate, dipentaerythritol pentaacrylate, trimethylolpropane diacrylate, ditrimethylolpropane triacrylate, pentaerythritol trimethacrylate, dipentaerythritol pentamethacrylate, trimethylolpropane dimethacrylate, and ditrimethylolpropane trimethacrylate. It is preferable to use 2-hydroxyethyl acrylate.

With regard to diols that can be used for the urethane prepolymer having a terminal NCO group or a terminal OH group, known diols can be used, and a diol having a branched structure but not having a cyclic structure is preferable. Examples thereof include the aliphatic diols below.

2,2-Dimethyl-1,3-propanediol, 3,3-dimethyl-1,5-pentanediol, 2-methyl-2-ethyl-1,3-propanediol, 3-methyl-3-ethyl-1,5-pentanediol, 2-methyl-2-propyl-1,3-propanediol, 3-methyl-3-propyl-1,5-pentanediol, 2-methyl-2-butyl-1,3-propanediol, 3-methyl-3-butyl-1,5-pentanediol, 2,2-diethyl-1,3-propanediol, 3,3-diethyl-1,5-pentanediol, 2-ethyl-2-butyl-1,3-propanediol, 3-ethyl-3-butyl-1,5-pentanediol, 2-ethyl-2-propyl-1,3-propanediol, 3-ethyl-3-propyl-1,5-pentanediol, 2,2-dibutyl-1,3-propanediol, 3,3-dibutyl-1,5-pentanediol, 2,2-dipropyl-1,3-propanediol, 3,3-dipropyl-1,5-pentanediol, 2-butyl-2-propyl-1,3-propanediol, 3-butyl-3-propyl-1,5-pentanediol, 2-ethyl-1,3-propanediol, 2-propyl-1,3-propanediol, 2-butyl-1,3-propanediol, 3-ethyl-1,5-pentanediol, 3-propyl-1,5-pentanediol, 3-butyl-1,5-pentanediol, 3-octyl-1,5-pentanediol, 3-myristyl-1,5-pentanediol, 3-stearyl-1,5-pentanediol, 2-ethyl-1,6-hexanediol, 2-propyl-1,6-hexanediol, 2-butyl-1,6-hexanediol, 5-ethyl-1,9-nonanediol, 5-propyl-1,9-nonanediol, and 5-butyl-1,9-nonanediol.

Among these, 2-ethyl-2-butyl-1,3-propanediol and 2,2-dimethyl-1,3-propanediol are preferable.

Furthermore, a polyester polyol employing the above-mentioned diol may be used.

The radiation curing compound of the present invention preferably has a molecular weight of 400 to 5,000. It is preferable if the molecular weight is in this range since unreacted material does not precipitate on the surface of a coating, the viscosity is appropriate, and sufficient smoothness can be obtained.

The radiation curing compound of the present invention has a radiation curing functional group in the molecule, and the radiation curing functional group is preferably an acryloyl group. The number of radiation curing functional groups in the molecule is preferably 2 to 6. It is preferable if the number of radiation curing functional groups is in this range since the starting material storage stability is high, and good curability can be obtained.

Since the radiation curing compound of the present invention has a radiation curing functional group in the molecule, the curability is excellent, and a higher crosslinking density can be obtained. As a result, it is possible to suppress precipitation of unreacted monomer component on the surface of a magnetic layer during long-term storage, and suppress degradation in transport durability due to long-term storage.

In the radiation-cured layer of the present invention, a known radiation curing compound may be used in combination with the radiation curing compound of the present invention.

As the radiation curing compound used in combination, those having two or more acryloyl groups in the molecule are preferable.

Preferred examples of the compound used in combination include those having a cyclic structure such as 5-ethyl-2-(2-hydroxy-1,1'-dimethylethyl)-5-(hydroxymethyl)-1,3-dioxane diacrylate, tetrahydrofurandimethanol diacrylate, and 3,9-bis(1,1-dimethyl-2-hydroxyethyl)-2,4,8,10-tetraoxaspiro(5,5)undecane diacrylate, and those having four or more acryloyl groups such as an ethylene oxide-modified triacrylate of trimethylolpropane, a propylene oxide-modified triacrylate of trimethylolpropane, dipentaerythritol tetraacrylate, dipentaerythritol pentaacrylate, dipentaerythritol hexaacrylate, and ditrimethylolpropane tetraacrylate.

Among these, tri- or higher functional aliphatic acrylates are preferable, and an ethylene oxide-modified triacrylate of trimethylolpropane and a propylene oxide-modified triacrylate of trimethylolpropane are preferable.

When used in combination, the content of the radiation curing compound of the present invention is preferably at least 30 wt % of the entire radiation curing compounds, and more preferably at least 50 wt %.

A radiation-cured layer comprises preferably no binder. A radiation-cured layer is preferably cured by exposing a layer which consists essentially of a radiation curing compound to radiation. The layer to be exposed to radiation may comprise such additives as a polymerization initiator or pigments.

The thickness of the radiation-cured layer in the present invention is preferably 0.1 to 1.0 µm. It is preferable if the thickness of the radiation-cured layer is within this range since sufficient smoothness can be obtained and the adhesion to a support is good.

The glass transition temperature (Tg) of the radiation-cured layer after curing is preferably 80° C. to 150° C., and more preferably 100° C. to 130° C. It is preferable if the glass transition temperature of the radiation-cured layer is in this range since there are no problems with tackiness during a coating step and the coating strength is desirable.

The modulus of elasticity of the radiation-cured layer after curing is preferably 1.5 to 4 GPa.

It is preferable if the modulus of elasticity is in this range since there are no problems with tackiness of a coating and the coating strength is desirable.

The average roughness (Ra) of the radiation-cured layer is preferably 1 to 3 nm for a cutoff value of 0.25 nm. It is preferable if it is in this range since there are few problems with sticking to a path roller during a coating step and the magnetic layer has sufficient smoothness.

The radiation used in the present invention may be an electron beam or ultraviolet rays. When ultraviolet rays are used, it is necessary to add a photopolymerization initiator to the above-mentioned compound. In the case of curing with an electron beam, no polymerization initiator is required, and the electron beam has a deep penetration depth, which is preferable.

With regard to electron beam accelerators, there are a scanning system, a double scanning system, and a curtain beam system, and the curtain beam system is preferable since it is relatively inexpensive and gives a high output. With regard to electron beam characteristics, the acceleration voltage is preferably 30 to 1,000 kV, and more preferably 50 to 300 kV, and the absorbed dose is preferably 0.5 to 20 Mrad, and more preferably 2 to 10 Mrad. It is preferable for the acceleration voltage to be in the above-mentioned range since the amount of energy penetrating is sufficient and the energy efficiency is good.

The electron beam irradiation atmosphere is preferably controlled by a nitrogen purge so that the concentration of oxygen is 200 ppm or less. It is preferable if the concentration of oxygen is in the above-mentioned range, since crosslinking and curing reactions in the vicinity of the surface are not inhibited.

As a light source for the ultraviolet rays, a mercury lamp is preferable. The mercury lamp is a 20 to 240 W/cm lamp and is preferably used at a speed of 0.3 to 20 m/min. The distance between a substrate and the mercury lamp is generally preferably 1 to 30 cm.

Furthermore, it is possible to use an ultraviolet ray light source employing a light-emitting diode having ultraviolet ray emission energy. For example, an LED light source having a peak emission wavelength of 365 nm can be used.

As the photopolymerization initiator used for ultraviolet curing, a radical photopolymerization initiator is used. More particularly, those described in, for example, 'Shinkobunshi Jikkengaku' (New Polymer Experiments), Vol. 2, Chapter 6 Photo/Radiation Polymerization (Published by Kyoritsu Publishing, 1995, Ed. by the Society of Polymer Science, Japan) can be used. Specific examples thereof include acetophenone, benzophenone, anthraquinone, benzoin ethyl ether, benzil methyl ketal, benzil ethyl ketal, benzoin isobutyl ketone, hydroxydimethyl phenyl ketone, 1-hydroxycyclohexyl phenyl ketone, and 2,2-diethoxyacetophenone. The mixing ratio of the aromatic ketone is preferably 0.5 to 20 parts by weight relative to 100 parts by weight of the radiation curing compound, more preferably 2 to 15 parts by weight, and yet more preferably 3 to 10 parts by weight.

With regard to the radiation-curing equipment, conditions, etc., known equipment and conditions described in 'UV EB Kokagijutsu' (UV/EB Radiation Curing Technology) (published by the Sogo Gijutsu Center), 'Teienerugi Denshisenshosha no Oyogijutsu' (Application of Low-energy Electron Beam) (2000, Published by CMC), etc. can be employed.

II. Magnetic Layer

Ferromagnetic Powder

The ferromagnetic powder contained in the magnetic layer in the present invention may employ either an acicular ferromagnetic powder or a tabular ferromagnetic powder. It is preferable to use a ferromagnetic metal powder as the acicular ferromagnetic powder and a ferromagnetic hexagonal ferrite powder as the tabular ferromagnetic powder.

Ferromagnetic Metal Powder

The ferromagnetic metal powder used in the magnetic recording medium of the present invention is preferably an acicular cobalt-containing ferromagnetic iron oxide or ferromagnetic alloy powder. The $S_{BET}$ (specific surface area measured by the BET method) is preferably 40 to 80 m²/g, and more preferably 50 to 70 m²/g. The crystallite size is preferably 12 to 25 nm, more preferably 13 to 22 nm, and particularly preferably 14 to 20 nm. The length of the major axis is preferably 20 to 70 nm, and more preferably 30 to 50 nm.

Examples of the ferromagnetic metal powder include yttrium-containing Fe, Fe—Co, Fe—Ni, and Co—Ni—Fe, and the yttrium content in the ferromagnetic metal powder is preferably 0.5 to 20 atom % as the yttrium atom/iron atom ratio Y/Fe, and more preferably 5 to 10 atom %. It is preferable if the yttrium content is in such a range since the ferromagnetic metal powder has a high σs value, and good magnetic properties and electromagnetic conversion characteristics can be obtained. Furthermore, since the iron content also becomes appropriate, it is possible to obtain good magnetic properties and electromagnetic conversion characteristics, which is preferable.

Furthermore, it is also possible for aluminum, silicon, sulfur, scandium, titanium, vanadium, chromium, manganese, copper, zinc, molybdenum, rhodium, palladium, tin, antimony, boron, barium, tantalum, tungsten, rhenium, gold, lead, phosphorus, lanthanum, cerium, praseodymium, neodymium, tellurium, bismuth, etc. to be present at 20 atom % or less relative to 100 atom % of iron. It is also possible for the ferromagnetic metal powder to contain a small amount of water, a hydroxide, or an oxide.

One example of a process for producing the ferromagnetic metal powder of the present invention, into which cobalt or yttrium has been introduced, is illustrated below.

For example, an iron oxyhydroxide obtained by blowing an oxidizing gas into an aqueous suspension in which a ferrous salt and an alkali have been mixed can be used as a starting material.

This iron oxyhydroxide is preferably of the α-FeOOH type, and with regard to a production process therefor, there is a first production process in which a ferrous salt is neutralized with an alkali hydroxide to form an aqueous suspension of $Fe(OH)_2$, and an oxidizing gas is blown into this suspension to give acicular α-FeOOH. There is also a second production process in which a ferrous salt is neutralized with an alkali carbonate to form an aqueous suspension of $FeCO_3$, and an oxidizing gas is blown into this suspension to give spindle-shaped α-FeOOH. Such an iron oxyhydroxide is preferably obtained by reacting an aqueous solution of a ferrous salt with an aqueous solution of an alkali to give an aqueous solution containing ferrous hydroxide, and then oxidizing this with air, etc. In this case, the aqueous solution of the ferrous salt may contain an Ni salt, a salt of an alkaline earth element such as Ca, Ba, or Sr, a Cr salt, a Zn salt, etc., and by selecting these salts appropriately the particle shape (axial ratio), etc. can be adjusted.

As the ferrous salt, ferrous chloride, ferrous sulfate, etc. are preferable. As the alkali, sodium hydroxide, aqueous ammonia, ammonium carbonate, sodium carbonate, etc. are preferable. With regard to salts that can be present at the same time, chlorides such as nickel chloride, calcium chloride, barium chloride, strontium chloride, chromium chloride, and zinc chloride are preferable.

In a case where cobalt is subsequently introduced into the iron, before introducing yttrium, an aqueous solution of a cobalt compound such as cobalt sulfate or cobalt chloride is mixed and stirred with a slurry of the above-mentioned iron oxyhydroxide. After the slurry of iron oxyhydroxide containing cobalt is prepared, an aqueous solution containing a yttrium compound is added to this slurry, and they are stirred and mixed.

In the present invention, neodymium, samarium, praseodymium, lanthanum, etc. can be introduced into the ferromagnetic metal powder of the present invention as well as yttrium. They can be introduced using a chloride such as yttrium chloride, neodymium chloride, samarium chloride, praseodymium chloride, or lanthanum chloride or a nitrate salt such as neodymium nitrate or gadolinium nitrate, and they can be used in a combination of two or more types.

Ferromagnetic Hexagonal Ferrite Powder

In the present invention, it is preferable to use a ferromagnetic hexagonal ferrite powder as the tabular ferromagnetic powder.

Examples of the ferromagnetic hexagonal ferrite powder include substitution products of barium ferrite, strontium ferrite, lead ferrite, and calcium ferrite, and Co substitution products. More specifically, magnetoplumbite type barium ferrite and strontium ferrite, magnetoplumbite type ferrite with a particle surface coated with a spinel, magnetoplumbite type barium ferrite and strontium ferrite partially containing a spinel phase, etc., can be cited. In addition to the designated atoms, an atom such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, or Zr may be included. In general, those to which Co—Ti, Co—Ti—Zr, Co—Ti—Zn, Ni—Ti—Zn, Nb—Zn—Co, Sb—Zn—Co, Nb—Zn, etc. have been added can be used. Characteristic impurities may be included depending on the starting material and the production process.

The plate size of the tabular magnetic substance is preferably 10 to 50 nm. Furthermore, the particle size is preferably 10 to 50 nm as a hexagonal plate size.

When a magnetoresistive head is used for playback, the plate size is preferably 10 to 40 nm so as to reduce noise. It is preferable if the plate size is in such a range since stable magnetization can be expected due to there being no influence from thermal fluctuations, and since noise is reduced it is suitable for high density magnetic recording.

The tabular ratio (plate size/plate thickness) is preferably 1 to 15, and more preferably 2 to 7. It is preferable if the tabular ratio is in such a range since packing of the magnetic layer is high and adequate orientation can be obtained and, furthermore, noise due to inter-particle stacking decreases.

The $S_{BET}$ (specific surface area by the BET method) of a powder having a particle size within this range is usually 10 to 200 m$^2$/g. The specific surface area substantially coincides with a value obtained by calculation using the plate size and the plate thickness. The crystallite size is preferably 50 to 450 Å, and more preferably 100 to 350 Å.

The plate size and the plate thickness distributions are preferably as narrow as possible. Although it is difficult, the distribution can be expressed using a numerical value by randomly measuring 500 particles on a TEM photograph of the particles. The distribution is not a regular distribution in many cases, but the standard deviation calculated with respect to the average size is preferably σ/average size=0.1 to 2.0. In order to narrow the particle size distribution, the reaction system used for forming the particles is made as homogeneous as possible, and the particles so formed are subjected to a distribution-improving treatment. For example, a method of selectively dissolving ultrafine particles in an acid solution is also known.

The coercive force (Hc) measured for the ferromagnetic hexagonal ferrite powder can be adjusted so as to be on the order of 39.8 to 398 kA/m (500 to 5,000 Oe). A higher Hc is advantageous for high-density recording, but it is restricted by the capacity of the recording head. It is usually on the order of 63.7 to 318 kA/m (800 to 4,000 Oe), but is preferably 119 to 279 kA/m (1,500 to 3,500 Oe). When the saturation magnetization of the head exceeds 1.4 T, it is preferably 159 kA/m (2,000 Oe) or higher. The Hc can be controlled by the particle size (plate size, plate thickness), the type and amount of element included, the element replacement sites, the conditions used for the particle formation reaction, etc. The saturation magnetization (σs) is preferably 40 to 80 A·m$^2$/kg (emu/g). A higher σs is preferable, but there is a tendency for it to become lower when the particles become finer. In order to improve the σs, making a composite of magnetoplumbite ferrite with spinel ferrite, selecting the types of element included and their amount, etc. are well known. It is also possible to use a W type hexagonal ferrite.

When dispersing the ferromagnetic hexagonal ferrite powder, the surface of the ferromagnetic hexagonal ferrite powder can be treated with a material that is compatible with a dispersing medium and a polymer. With regard to a surface-treatment agent, an inorganic or organic compound can be used. Representative examples include oxides and hydroxides of Si, Al, P, etc., and various types of silane coupling agents and various kinds of titanium coupling agents. The amount thereof is 0.1% to 10% based on the ferromagnetic hexagonal ferrite powder. The pH of the ferromagnetic hexagonal ferrite powder is also important for dispersion. It is usually on the order of 4 to 12, and although the optimum value depends on the dispersing medium and the polymer, it is preferably on the order of 6 to 10 from the viewpoints of chemical stability and storage properties of the magnetic recording medium. Moisture contained in the ferromagnetic hexagonal ferrite powder also influences the dispersion. Although the optimum value depends on the dispersing medium and the polymer, it is usually preferably from 0.01% to 2.0%.

With regard to a production method for the ferromagnetic hexagonal ferrite powder, there are: glass crystallization method (1) in which barium oxide, iron oxide, a metal oxide that replaces iron, and boron oxide, etc. as glass forming materials are mixed so as to give a desired ferrite composition, then melted and rapidly cooled to give an amorphous substance, subsequently reheated, then washed and ground to give a barium ferrite crystal powder; hydrothermal reaction method (2) in which a barium ferrite composition metal salt solution is neutralized with an alkali, and after a by-product is removed, it is heated in a liquid phase at 100° C. or higher, then washed, dried and ground to give a barium ferrite crystal powder; and co-precipitation method (3) in which a barium ferrite composition metal salt solution is neutralized with an alkali, and after a by-product is removed, it is dried and treated at 1,100° C. or less, and ground to give a barium ferrite crystal powder, etc., but in the present invention any method may be chosen.

Binder

Examples of the binder used in the magnetic layer include a polyurethane resin, a polyester resin, a polyamide resin, a vinyl chloride resin, an acrylic resin obtained by copolymerization of styrene, acrylonitrile, methyl methacrylate, etc., a cellulose resin such as nitrocellulose, an epoxy resin, a phenoxy resin, and a polyvinyl alkyral resin such as polyvinyl acetal or polyvinyl butyral, and they can be used singly or in a combination of two or more types. Among these, the polyurethane resin, the acrylic resin, the cellulose resin, and the vinyl chloride resin are preferable.

In order to improve the dispersibility of the ferromagnetic powder and the non-magnetic powder, the binder preferably has a functional group (polar group) that is adsorbed on the surface of the powders. Preferred examples of the functional group include —SO$_3$M, —SO$_4$M, —PO(OM)$_2$, —OPO(OM)$_2$, —COOM, >NSO$_3$M, >NRSO$_3$M, —NR$^1$R$^2$, and —N$^+$R$^1$R$^2$R$^3$X$^-$. M denotes a hydrogen atom or an alkali metal such as Na or K, R denotes an alkylene group, R$^1$, R$^2$, and R$^3$ denote alkyl groups, hydroxyalkyl groups, or hydrogen atoms, and X denotes a halogen such as Cl or Br. The amount of functional group in the binder is preferably 10 to 200 μeq/g, and more preferably 30 to 120 μeq/g. It is preferable if it is in this range since good dispersibility can be achieved.

The binder preferably includes, in addition to the adsorbing functional group, a functional group having an active hydrogen, such as an —OH group, in order to improve the coating strength by reacting with an isocyanate curing agent so as to form a crosslinked structure. A preferred amount is 0.1 to 2 meq/g.

The molecular weight of the binder is preferably 10,000 to 200,000 as a weight-average molecular weight, and more preferably 20,000 to 100,000. It is preferable if the weight-average molecular weight is in this range since the coating strength is sufficient, the durability is good, and the dispersibility improves.

The polyurethane resin, which is a preferred binder, is described in detail in, for example, 'Poriuretan Jushi Handobukku' (Polyurethane Resin Handbook) (Ed., K. Iwata, 1986, The Nikkan Kogyo Shimbun, Ltd.), and it may normally be obtained by addition-polymerization of a long chain diol, a short chain diol (also known as a chain extending agent), and a diisocyanate compound. As the long chain diol, a polyester diol, a polyether diol, a polyetherester diol, a polycarbonate diol, a polyolefin diol, etc, having a molecular weight of 500 to 5,000 may be used. Depending on the type of this long chain polyol, the polyurethane is called a polyester urethane, a polyether urethane, a polyetherester urethane, a polycarbonate urethane, etc.

The polyester diol may be obtained by a condensation-polymerization between a glycol and a dibasic aliphatic acid such as adipic acid, sebacic acid, or azelaic acid, or a dibasic aromatic acid such as isophthalic acid, orthophthalic acid, terephthalic acid, or naphthalenedicarboxylic acid. Examples of the glycol component include ethylene glycol, 1,2-propylene glycol, 1,3-propanediol, 1,4-butanediol, 1,5-pentanediol, 3-methyl-1,5-pentanediol, 1,6-hexanediol, 2,2-dimethyl-1,3-propanediol, 1,8-octanediol, 1,9-nonanediol, cyclohexanediol, cyclohexanedimethanol, and hydrogenated bisphenol A. As the polyester diol, in addition to the above, a polycaprolactonediol or a polyvalerolactonediol obtained by ring-opening polymerization of a lactone such as ε-caprolactone or γ-valerolactone can be used.

From the viewpoint of resistance to hydrolysis, the polyester diol is preferably one having a branched side chain or one obtained from an aromatic or alicyclic starting material.

Examples of the polyether diol include polyethylene glycol, polypropylene glycol, polytetramethylene glycol, aromatic glycols such as bisphenol A, bisphenol S, bisphenol P, and hydrogenated bisphenol A, and addition-polymerization products from an alicyclic diol and an alkylene oxide such as ethylene oxide or propylene oxide.

These long chain diols can be used as a mixture of a plurality of types thereof.

The short chain diol can be chosen from the compound group that is cited as the glycol component of the above-mentioned polyester diol. Furthermore, a small amount of a tri- or higher-hydric alcohol such as, for example, trimethylolethane, trimethylolpropane, or pentaerythritol can be added, and this gives a polyurethane resin having a branched structure, thus reducing the solution viscosity and increasing the number of OH end groups of the polyurethane so as to improve the curability with the isocyanate curing agent.

Examples of the diisocyanate compound include aromatic diisocyanates such as MDI (diphenylmethane diisocyanate), 2,4-TDI (tolylene diisocyanate), 2,6-TDI, 1,5-NDI (naphthalene diisocyanate), TODI (tolidine diisocyanate), p-phenylene diisocyanate, and XDI (xylylene diisocyanate), and aliphatic and alicyclic diisocyanates such as trans-cyclohexane-1,4-diisocyanate, HDI (hexamethylene diisocyanate), IPDI (isophorone diisocyanate), $H_6$XDI (hydrogenated xylylene diisocyanate), and $H_{12}$MDI (hydrogenated diphenylmethane diisocyanate).

The long chain diol/short chain diol/diisocyanate ratio in the polyurethane resin is preferably (80 to 15 wt %)/(5 to 40 wt %)/(15 to 50 wt %).

The concentration of urethane groups in the polyurethane resin is preferably 1 to 5 meq/g, and more preferably 1.5 to 4.5 meq/g. If the concentration of urethane groups is less than this range, the mechanical strength is low, and if it is more than this range, the solution viscosity is high and the dispersibility is degraded.

The glass transition temperature of the polyurethane resin is preferably 0° C. to 200° C., and more preferably 40° C. to 160° C. If it is no less than 30° C., the durability is not low, and if it is no greater than 200° C., the calender moldability is not degraded and the electromagnetic conversion characteristics does not deteriorate.

With regard to a method for introducing the adsorbing functional group (polar group) into the polyurethane resin, there are, for example, a method in which the functional group is used in a part of the long chain diol monomer, a method in which it is used in a part of the short chain diol, and a method in which, after the polyurethane is formed by polymerization, the polar group is introduced by a polymer reaction.

As the vinyl chloride resin, a copolymer of a vinyl chloride monomer and various types of monomer may be used.

Examples of the comonomer include fatty acid vinyl esters such as vinyl acetate and vinyl propionate, acrylates and methacrylates such as methyl (meth)acrylate, ethyl (meth)acrylate, isopropyl (meth)acrylate, butyl (meth)acrylate, and benzyl (meth)acrylate, alkyl allyl ethers such as allyl methyl ether, allyl ethyl ether, allyl propyl ether, and allyl butyl ether, and others such as styrene, α-methylstyrene, vinylidene chloride, acrylonitrile, ethylene, butadiene, and acrylamide; examples of a comonomer having a functional group include vinyl alcohol, 2-hydroxyethyl (meth)acrylate, polyethylene glycol (meth)acrylate, 2-hydroxypropyl (meth)acrylate, 3-hydroxypropyl (meth)acrylate, polypropylene glycol (meth)acrylate, 2-hydroxyethyl allyl ether, 2-hydroxypropyl allyl ether, 3-hydroxypropyl allyl ether, p-vinylphenol, maleic acid, maleic anhydride, acrylic acid, methacrylic acid, glycidyl (meth)acrylate, allyl glycidyl ether, phosphoethyl (meth)acrylate, sulfoethyl (meth)acrylate, p-styrenesulfonic acid, and Na salts and K salts thereof.

The proportion of the vinyl chloride monomer in the vinyl chloride resin is preferably 60 to 95 wt %. It is preferable if it is in this range since the mechanical strength improves, the solvent solubility is high, and good dispersibility can be obtained due to desirable solution viscosity.

A preferred amount of a functional group for improving the curability of the adsorbing functional group (polar group) with a polyisocyanate curing agent is as described above. With regard to a method for introducing these functional groups, a monomer containing the above-mentioned functional group may be copolymerized, or after the vinyl chloride resin is formed by copolymerization, the functional group may be introduced by a polymer reaction.

A preferred degree of polymerization is 200 to 600, and more preferably 240 to 450. It is preferable if the degree of polymerization is in this range since the mechanical strength is high and good dispersibility can be obtained due to desirable solution viscosity.

In order to increase the mechanical strength and heat resistance of a coating by crosslinking and curing the binder used in the present invention, it is possible to use a curing agent. A preferred curing agent is a polyisocyanate compound. The polyisocyanate compound is preferably a tri- or higher-functional polyisocyanate.

Specific examples thereof include adduct type polyisocyanate compounds such as a compound in which 3 moles of TDI (tolylene diisocyanate) are added to 1 mole of trimethylolpropane (TMP), a compound in which 3 moles of HDI (hexamethylene diisocyanate) are added to 1 mole of TMP, a compound in which 3 moles of IPDI (isophorone diisocyanate) are added to 1 mole of TMP, and a compound in which 3 moles of XDI (xylylene diisocyanate) are added to 1 mole of TMP, a condensed isocyanurate type trimer of TDI, a condensed isocyanurate type pentamer of TDI, a condensed isocyanurate heptamer of TDI, mixtures thereof, an isocyanurate type condensation product of HDI, an isocyanurate type condensation product of IPDI, and crude MDI.

Among these, the compound in which 3 moles of TDI are added to 1 mole of TMP, and the isocyanurate type trimer of TDI are preferable.

Other than the isocyanate curing agents, a radiation curing agent that cures when exposed to an electron beam, ultraviolet rays, etc. may be used. In this case, it is possible to use a curing agent having, as radiation curing functional groups, two or more, and preferably three or more, acryloyl or methacryloyl groups per molecule. Examples thereof include TMP (trimethylolpropane) triacrylate, pentaerythritol tetraacrylate, and a urethane acrylate oligomer. In this case, it is preferable to introduce a (meth)acryloyl group not only into the curing agent but also into the binder. In the case of curing with ultraviolet rays, a photosensitizer is additionally used.

It is preferable to add 0 to 80 parts by weight of the curing agent relative to 100 parts by weight of the binder. It is preferable if the amount is in this range since the dispersibility is good.

The amount of binder added to the magnetic layer is preferably 5 to 30 parts by weight relative to 100 parts by weight of the ferromagnetic powder, and more preferably 10 to 20 parts by weight.

Additives may be added as necessary to the magnetic layer of the present invention. Examples of the additives include an abrasive, a lubricant, a dispersant/dispersion adjuvant, a fungicide, an antistatic agent, an antioxidant, a solvent, and carbon black.

Examples of these additives include molybdenum disulfide, tungsten disulfide, graphite, boron nitride, graphite fluoride, a silicone oil, a polar group-containing silicone, a fatty acid-modified silicone, a fluorine-containing silicone, a fluorine-containing alcohol, a fluorine-containing ester, a polyolefin, a polyglycol, a polyphenyl ether; aromatic ring-containing organic phosphonic acids such as phenylphosphonic acid, benzylphosphonic acid, phenethylphosphonic acid, α-methylbenzylphosphonic acid, 1-methyl-1-phenethylphosphonic acid, diphenylmethylphosphonic acid, biphenylphosphonic acid, benzylphenylphosphonic acid, α-cumylphosphonic acid, tolylphosphonic acid, xylylphosphonic acid, ethylphenylphosphonic acid, cumenylphosphonic acid, propylphenylphosphonic acid, butylphenylphosphonic acid, heptylphenylphosphonic acid, octylphenylphosphonic acid, and nonylphenylphosphonic acid, and alkali metal salts thereof; alkylphosphonic acids such as octylphosphonic acid, 2-ethylhexylphosphonic acid, isooctylphosphonic acid, isononylphosphonic acid, isodecylphosphonic acid, isoundecylphosphonic acid, isododecylphosphonic acid, isohexadecylphosphonic acid, isooctadecylphosphonic acid, and isoeicosylphosphonic acid, and alkali metal salts thereof; aromatic phosphates such as phenyl phosphate, benzyl phosphate, phenethyl phosphate, α-methylbenzyl phosphate, 1-methyl-1-phenethyl phosphate, diphenylmethyl phosphate, biphenyl phosphate, benzylphenyl phosphate, α-cumyl phosphate, tolyl phosphate, xylyl phosphate, ethylphenyl phosphate, cumenyl phosphate, propylphenyl phosphate, butylphenyl phosphate, heptylphenyl phosphate, octylphenyl phosphate, and nonylphenyl phosphate, and alkali metal salts thereof; alkyl phosphates such as octyl phosphate, 2-ethylhexyl phosphate, isooctyl phosphate, isononyl phosphate, isodecyl phosphate, isoundecyl phosphate, isododecyl phosphate, isohexadecyl phosphate, isooctadecyl phosphate, and isoeicosyl phosphate, and alkali metal salts thereof; and alkyl sulfonates and alkali metal salts thereof; fluorine-containing alkyl sulfates and alkali metal salts thereof; monobasic fatty acids that have 10 to 24 carbons, may contain an unsaturated bond, and may be branched, such as lauric acid, myristic acid, palmitic acid, stearic acid, behenic acid, oleic acid, linoleic acid, linolenic acid, elaidic acid, and erucic acid, and metal salts thereof; mono-fatty acid esters, di-fatty acid esters, and poly-fatty acid esters such as butyl stearate, octyl stearate, amyl stearate, isooctyl stearate, octyl myristate, butyl laurate, butoxyethyl stearate, anhydrosorbitan monostearate, anhydrosorbitan distearate, and anhydrosorbitan tristearate that are formed from a monobasic fatty acid that has 10 to 24 carbons, may contain an unsaturated bond, and may be branched, and any one of a mono- to hexa-hydric alcohol that has 2 to 22 carbons, may contain an unsaturated bond, and may be branched, an alkoxy alcohol that has 12 to 22 carbons, may have an unsaturated bond, and may be branched, and a mono alkyl ether of an alkylene oxide polymer; fatty acid amides having 2 to 22 carbons; aliphatic amines having 8 to 22 carbons; etc. Other than the above-mentioned hydrocarbon groups, those having an alkyl, aryl, or aralkyl group that is substituted with a group other than a hydrocarbon group, such as a nitro group, F, Cl, Br, or a halogen-containing hydrocarbon such as $CF_3$, $CCl_3$, or $CBr_3$ can also be used.

Furthermore, there are a nonionic surfactant such as an alkylene oxide type, a glycerol type, a glycidol type, or an alkylphenol-ethylene oxide adduct; a cationic surfactant such as a cyclic amine, an ester amide, a quaternary ammonium salt, a hydantoin derivative, a heterocyclic compound, a phosphonium salt, or a sulfonium salt; an anionic surfactant containing an acidic group such as a carboxylic acid, a sulfonic acid or a sulfate ester group; and an amphoteric surfactant such as an amino acid, an aminosulfonic acid, a sulfate ester or a phosphate ester of an amino alcohol, or an alkylbetaine. Details of these surfactants are described in 'Kaimenkasseizai Binran' (Surfactant Handbook) (published by Sangyo Tosho Publishing).

These dispersants, lubricants, etc. need not always be pure and may contain, in addition to the main component, an impurity such as an isomer, an unreacted material, a by-product, a decomposition product, or an oxide. However, the impurity content is preferably 30 wt % or less, and more preferably 10 wt % or less.

Specific examples of these additives include NAA-102, hardened castor oil fatty acid, NAA-42, Cation SA, Nymeen L-201, Nonion E-208, Anon BF, and Anon LG, (produced by Nippon Oil & Fats Co., Ltd.); FAL-205, and FAL-123 (produced by Takemoto Oil & Fat Co., Ltd); Enujelv OL (produced by New Japan Chemical Co., Ltd.); TA-3 (produced by Shin-Etsu Chemical Industry Co., Ltd.); Armide P (produced by Lion Armour); Duomin TDO (produced by Lion Corporation); BA-41G (produced by The Nisshin Oilli O Group, Ltd.); and Profan 2012E, Newpol PE 61, and Ionet MS-400 (produced by Sanyo Chemical Industries, Ltd.).

In the present invention, an organic solvent used for the magnetic layer can be a known organic solvent. As the organic solvent, a ketone such as acetone, methyl ethyl ketone, methyl isobutyl ketone, diisobutyl ketone, cyclohexanone, or isophorone, an alcohol such as methanol, ethanol, propanol, butanol, isobutyl alcohol, isopropyl alcohol, or methylcyclohexanol, an ester such as methyl acetate, butyl acetate, isobutyl acetate, isopropyl acetate, ethyl lactate, or glycol acetate, a glycol ether such as glycol dimethyl ether, glycol monoethyl ether, or dioxane, an aromatic hydrocarbon such as benzene, toluene, xylene, or cresol, a chlorohydrocarbon such as methylene chloride, ethylene chloride, carbon tetrachloride, chloroform, ethylene chlorohydrin, chlorobenzene, or dichlorobenzene, N,N-dimethylformamide, hexane, tetrahydrofuran, etc. can be used at any ratio.

These organic solvents do not always need to be 100% pure, and may contain an impurity such as an isomer, an unreacted compound, a by-product, a decomposition product, an oxide, or moisture in addition to the main component. The content of these impurities is preferably 30% or less, and more preferably 10% or less. The organic solvent used in the present invention is preferably the same type for both the magnetic layer and a non-magnetic layer. However, the amount added may be varied. The coating stability is improved by using a high surface tension solvent (cyclohexanone, dioxane, etc.) for the non-magnetic layer; more specifically, it is important that the arithmetic mean value of the surface tension of the magnetic layer (upper layer) solvent composition is not less than that for the surface tension of the non-magnetic layer solvent composition. In order to improve the dispersibility, it is preferable for the polarity to be somewhat strong, and the solvent composition preferably contains 50% or more of a solvent having a permittivity of 15 or higher. The solubility parameter is preferably 8 to 11.

The type and the amount of the dispersant, lubricant, and surfactant used in the magnetic layer of the present invention can be changed as necessary in the magnetic layer and a non-magnetic layer, which will be described later.

For example, although not limited to only the examples illustrated here, the dispersant has the property of adsorbing or bonding via its polar group, and it is surmised that the dispersant adsorbs or bonds, via the polar group, to mainly the surface of the ferromagnetic powder in the magnetic layer and mainly the surface of the non-magnetic powder in the non-magnetic layer, which will be described later, and once adsorbed it is hard to desorb an organophosphorus compound from the surface of a metal, a metal compound, etc. Therefore, since in the present invention the surface of the ferromagnetic powder or the surface of a non-magnetic powder, which will be described later, are in a state in which they are covered with an alkyl group, an aromatic group, etc., the affinity of the ferromagnetic powder or the non-magnetic powder toward the binder resin component increases and, furthermore, the dispersion stability of the ferromagnetic powder or the non-magnetic powder is also improved. With regard to the lubricant, since it is present in a free state, its exudation to the surface is controlled by using fatty acids having different melting points for the non-magnetic layer and the magnetic layer or by using esters having different boiling points or polarity. The coating stability can be improved by regulating the amount of surfactant added, and the lubrication effect can be improved by increasing the amount of lubricant added to the non-magnetic layer. Furthermore, all or a part of the additives used in the present invention may be added to a magnetic coating solution or a non-magnetic coating solution at any stage of its preparation. For example, the additives may be blended with a ferromagnetic powder prior to a kneading step, they may be added in a step of kneading a ferromagnetic powder, a binder, and a solvent, they may be added in a dispersing step, they may be added after dispersion, or they may be added immediately prior to coating.

The magnetic layer of the present invention may contain carbon black as necessary.

The type of carbon black that can be used includes furnace black for rubber, thermal black for rubber, carbon black for coloring, acetylene black, etc. The carbon black of the radiation-cured layer should have optimized characteristics as follows depending on desired effects, and this may be achieved by using a combination thereof.

The specific surface area of the carbon black is preferably 100 to 500 $m^2/g$, and more preferably 150 to 400 $m^2/g$, and the DBP oil absorption thereof is preferably 20 to 400 mL/100 g, and more preferably 30 to 200 mL/100 g. The average particle size of the carbon black is preferably 5 to 80 nm, more preferably 10 to 50 nm, and yet more preferably 10 to 40 nm. The pH of the carbon black is preferably 2 to 10, the water content thereof is preferably 0.1% to 10%, and the tap density is preferably 0.1 to 1 g/mL.

Specific examples of the carbon black used in the present invention include BLACKPEARLS 2000, 1300, 1000, 900, 800, 880 and 700, and VULCAN XC-72 (manufactured by Cabot Corporation), #3050B, #3150B, #3250B, #3750B, #3950B, #950, #650B, #970B, #850B, MA-600, MA-230, #4000, and #4010 (manufactured by Mitsubishi Chemical Corporation), CONDUCTEX SC, RAVEN 8800, 8000, 7000, 5750, 5250, 3500, 2100, 2000, 1800, 1500, 1255, and 1250 (manufactured by Columbian Carbon Co.), and Ketjen Black EC (manufactured by Akzo).

The carbon black may be surface treated using a dispersant or grafted with a resin, or part of the surface thereof may be converted into graphite. Prior to adding carbon black to a coating solution, the carbon black may be predispersed with a binder. The carbon black that can be used in the present invention can be selected by referring to, for example, the 'Kabon Burakku Handobukku' (Carbon Black Handbook) (edited by the Carbon Black Association of Japan).

The carbon black may be used singly or in a combination of different types thereof. When the carbon black is used, it is preferably used in an amount of 0.1 to 30 wt % based on the weight of the ferromagnetic powder. The carbon black has the functions of preventing static charging of the magnetic layer, reducing the coefficient of friction, imparting light-shielding properties, and improving the film strength. Such functions vary depending upon the type of carbon black. Accordingly, it is of course possible in the present invention to appropriately choose the type, the amount and the combination of carbon black for the magnetic layer according to the intended purpose on the basis of the above mentioned various properties such as the particle size, the oil absorption, the electrical conductivity, and the pH value, and it is better if they are optimized for the respective layers.

III. Non-Magnetic Layer

The magnetic recording medium of the present invention can include a non-magnetic layer on a non-magnetic support, the non-magnetic layer containing a binder and a non-magnetic powder. The non-magnetic powder that can be used in the non-magnetic layer may be an inorganic substance or an organic substance. The non-magnetic layer may further include carbon black as necessary together with the non-magnetic powder.

Non-Magnetic Powder

Details of the non-magnetic layer are now explained.

The magnetic recording medium of the present invention may include a non-magnetic layer (lower layer) including a non-magnetic powder and a binder above a non-magnetic support provided with a radiation-cured layer.

The non-magnetic layer may employ a magnetic powder as long as the lower layer is substantially non-magnetic, but preferably employs a non-magnetic powder.

The non-magnetic powder that can be used in the non-magnetic layer may be an inorganic substance or an organic substance. It is also possible to use carbon black, etc. Examples of the inorganic substance include a metal, a metal oxide, a metal carbonate, a metal sulfate, a metal nitride, a metal carbide, and a metal sulfide.

Specific examples thereof include a titanium oxide such as titanium dioxide, cerium oxide, tin oxide, tungsten oxide, ZnO, $ZrO_2$, $SiO_2$, $Cr_2O_3$, α-alumina having an α-component proportion of 90% to 100%, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide, and they can be used singly or in a combination of two or more types. α-Iron oxide or a titanium oxide is preferable.

The form of the non-magnetic powder may be any one of acicular, spherical, polyhedral, and tabular.

The crystallite size of the non-magnetic powder is preferably 4 nm to 1 μm, and more preferably 40 to 100 nm. When the crystallite size is in the range of 4 nm to 1 μm, there are no problems with dispersion and a suitable surface roughness is obtained.

The average particle size of these non-magnetic powders is preferably 5 nm to 2 μm, but it is possible to combine non-magnetic powders having different average particle sizes as necessary, or widen the particle size distribution of a single non-magnetic powder, thus producing the same effect. The average particle size of the non-magnetic powder is particularly preferably 10 to 200 nm. It is preferable if it is in the range of 5 nm to 2 μm, since good dispersibility and a suitable surface roughness can be obtained.

The specific surface area of the non-magnetic powder is preferably 1 to 100 $m^2/g$, more preferably 5 to 70 $m^2/g$, and yet more preferably 10 to 65 $m^2/g$. It is preferable if the specific surface area is in the range of 1 to 100 $m^2/g$, since a suitable surface roughness can be obtained, and dispersion can be carried out using a desired amount of binder.

The oil absorption obtained using dibutyl phthalate (DBP) is preferably 5 to 100 mL/100 g, more preferably 10 to 80 mL/100 g, and yet more preferably 20 to 60 mL/100 g.

The specific gravity is preferably 1 to 12, and more preferably 3 to 6. The tap density is preferably 0.05 to 2 g/mL, and more preferably 0.2 to 1.5 g/mL. When the tap density is in the range of 0.05 to 2 g/mL, there is little scattering of particles, the operation is easy, and there tends to be little sticking to equipment.

The pH of the non-magnetic powder is preferably 2 to 11, and particularly preferably 6 to 9. When the pH is in the range of 2 to 11, the coefficient of friction does not increase as a result of high temperature and high humidity or release of a fatty acid.

The water content of the non-magnetic powder is preferably 0.1 to 5 wt %, more preferably 0.2 to 3 wt %, and yet more preferably 0.3 to 1.5 wt %. It is preferable if the water content is in the range of 0.1 to 5 wt %, since dispersion is good, and the viscosity of a dispersed coating solution becomes stable.

The ignition loss is preferably 20 wt % or less, and a small ignition loss is preferable.

When the non-magnetic powder is an inorganic powder, the Mohs hardness thereof is preferably in the range of 4 to 10. When the Mohs hardness is in the range of 4 to 10, it is possible to guarantee the durability. The amount of stearic acid absorbed by the non-magnetic powder is 1 to 20 μmol/$m^2$, and preferably 2 to 15 μmol/$m^2$.

The heat of wetting of the non-magnetic powder in water at 25° C. is preferably in the range of 20 to 60 μJ/$cm^2$ (200 to 600 erg/$cm^2$). It is possible to use a solvent that gives a heat of wetting in this range.

The number of water molecules on the surface at 100° C. to 400° C. is suitably 1 to 10/100 Å. The pH at the isoelectric point in water is preferably between 3 and 9.

The surface of the non-magnetic powder is preferably subjected to a surface treatment with $Al_2O_3$, $SiO_2$, $TiO_2$, $ZrO_2$, $SnO_2$, $Sb_2O_3$, or ZnO. In terms of dispersibility in particular, $Al_2O_3$, $SiO_2$, $TiO_2$, and $ZrO_2$ are preferable, and $Al_2O_3$, $SiO_2$, and $ZrO_2$ are more preferable. They may be used in combination or singly. Depending on the intended purpose, a surface-treated layer may be obtained by co-precipitation, or a method can be employed in which the surface is firstly treated with alumina and the surface thereof is then treated with silica, or vice versa. The surface-treated layer may be formed as a porous layer depending on the intended purpose, but it is generally preferable for it to be uniform and dense.

Specific examples of the non-magnetic powder used in the non-magnetic layer in the present invention include Nanotite (manufactured by Showa Denko K.K.), HIT-100 and ZA-G1 (manufactured by Sumitomo Chemical Co., Ltd.), DPN-250, DPN-250BX, DPN-245, DPN-270BX, DPB-550BX, and DPN-550RX (manufactured by Toda Kogyo Corp.), titanium oxide TTO-51B, TTO-55A, TTO-55B, TTO-55C, TTO-55S, TTO-55D, and SN-100, MJ-7, and α-iron oxide E270, E271, and E300 (manufactured by Ishihara Sangyo Kaisha Ltd.), titanium oxide STT-4D, STT-30D, STT-30, and STT-65C (manufactured by Titan Kogyo Kabushiki Kaisha), MT-100S, MT-100T, MT-150W, MT-500B, MT-600B, MT-100F, and MT-500HD (manufactured by Tayca Corporation), FINEX-25, BF-1, BF-10, BF-20, and ST-M (manufactured by Sakai Chemical Industry Co., Ltd.), DEFIC-Y and DEFIC-R (manufactured by Dowa Mining Co., Ltd.), AS2BM and TiO2P25 (manufactured by Nippon Aerosil Co., Ltd.), 100A, and 500A (manufactured by Ube Industries, Ltd.), Y-LOP (manufactured by Titan Kogyo Kabushiki Kaisha), and calcined products thereof. Particularly preferred non-magnetic powders are titanium dioxide and α-iron oxide.

By mixing carbon black with the non-magnetic powder, the surface electrical resistance of the non-magnetic layer can be reduced, the light transmittance can be decreased, and a desired μVickers hardness can be obtained. The μVickers hardness of the non-magnetic layer is preferably 25 to 60 kg/$mm^2$, and is more preferably 30 to 50 kg/$mm^2$ in order to adjust the head contact, and can be measured using a thin film hardness meter (HMA-400 manufactured by NEC Corporation) with, as an indentor tip, a triangular pyramidal diamond needle having a tip angle of 80° and a tip radius of 0.1 μm. The light transmittance is generally standardized such that the absorption of infrared rays having a wavelength of on the order of 900 nm is 3% or less and, in the case of, for example, VHS magnetic tapes, 0.8% or less. Because of this, furnace black for rubber, thermal black for rubber, carbon black for coloring, acetylene black, etc. can be used.

The specific surface area of the carbon black used in the non-magnetic layer in the present invention is preferably 100 to 500 m$^2$/g, and more preferably 150 to 400 m$^2$/g, and the DBP oil absorption thereof is preferably 20 to 400 mL/100 g, and more preferably 30 to 200 mL/100 g. The particle size of the carbon black is preferably 5 to 80 nm, more preferably 10 to 50 nm, and yet more preferably 10 to 40 nm. The pH of the carbon black is preferably 2 to 10, the water content thereof is preferably 0.1% to 10%, and the tap density is preferably 0.1 to 1 g/mL.

Specific examples of the carbon black that can be used in the non-magnetic layer in the present invention include BLACKPEARLS 2000, 1300, 1000, 900, 800, 880 and 700, and VULCAN XC-72 (manufactured by Cabot Corporation), #3050B, #3150B, #3250B, #3750B, #3950B, #950, #650B, #970B, #850B, and MA-600 (manufactured by Mitsubishi Chemical Corporation), CONDUCTEX SC, RAVEN 8800, 8000, 7000, 5750, 5250, 3500, 2100, 2000, 1800, 1500, 1255 and 1250 (manufactured by Columbian Carbon Co.), and Ketjen Black EC (manufactured by Akzo).

The carbon black may be surface treated using a dispersant or grafted with a resin, or part of the surface thereof may be converted into graphite. Prior to adding carbon black to a coating solution, the carbon black may be predispersed with a binder. The carbon black is preferably used in a range that does not exceed 50 wt % of the above-mentioned inorganic powder and in a range that does not exceed 40 wt % of the total weight of the non-magnetic layer. These types of carbon black may be used singly or in combination. The carbon black that can be used in the non-magnetic layer of the present invention can be selected by referring to, for example, the 'Kabon Burakku Binran' (Carbon Black Handbook) (edited by the Carbon Black Association of Japan).

It is also possible to add an organic powder to the non-magnetic layer, depending on the intended purpose. Examples of such an organic powder include an acrylic styrene resin powder, a benzoguanamine resin powder, a melamine resin powder, and a phthalocyanine pigment, but a polyolefin resin powder, a polyester resin powder, a polyamide resin powder, a polyimide resin powder, and a polyfluoroethylene resin can also be used. Production methods such as those described in JP-A-62-18564 and JP-A-60-255827 may be used.

IV. Non-Magnetic Support

With regard to the non-magnetic support that can be used in the present invention, known biaxially stretched films such as polyethylene terephthalate, polyethylene naphthalate, polyamide, polyamideimide, and aromatic polyamide can be used. Among these, polyethylene terephthalate, polyethylene naphthalate, and polyamide are preferred.

These supports may be subjected in advance to a corona discharge treatment, a plasma treatment, a treatment for enhancing adhesion, a thermal treatment, etc. The non-magnetic support that can be used in the present invention preferably has a surface roughness such that its center plane average surface roughness Ra is in the range of 3 to 10 nm for a cutoff value of 0.25 mm.

V. Backcoat Layer

In general, there is a strong requirement for magnetic tapes for recording computer data to have better repetitive transport properties than video tapes and audio tapes. In order to maintain such high storage stability, a backcoat layer can be provided on the surface of the non-magnetic support opposite to the surface where the non-magnetic layer and the magnetic layer are provided. As a coating solution for the backcoat layer, a binder and a particulate component such as an abrasive or an antistatic agent are dispersed in an organic solvent. As a granular component, various types of inorganic pigment or carbon black may be used. As the binder, a resin such as nitrocellulose, a phenoxy resin, a vinyl chloride resin, or a polyurethane can be used singly or in combination.

VI. Layer Structure

In the constitution of the magnetic recording medium used in the present invention, the thickness of the radiation-cured layer is preferably in the range of 0.1 to 1.0 μm, as described above, and more preferably 0.3 to 0.7 μm. Furthermore, the thickness of the non-magnetic support is preferably 3 to 80 μm. Moreover, the thickness of the backcoat layer provided on the surface of the non-magnetic support opposite to the surface where the non-magnetic layer and the magnetic layer are provided is preferably 0.1 to 1.0 μm, and more preferably 0.2 to 0.8 μm.

The thickness of the magnetic layer is optimized according to the saturation magnetization and the head gap of the magnetic head and the bandwidth of the recording signal, but it is preferably 0.01 to 0.12 μm, and more preferably 0.02 to 0.10 μm. The percentage variation in thickness of the magnetic layer is preferably ±50% or less, and more preferably ±40% or less. The magnetic layer can be at least one layer, but it is also possible to provide two or more separate layers having different magnetic properties, and a known configuration for a multilayer magnetic layer can be employed.

The thickness of the non-magnetic layer in the present invention is preferably 0.2 to 3.0 μm, more preferably 0.3 to 2.5 μm, and yet more preferably 0.4 to 2.0 μm. The non-magnetic layer of the magnetic recording medium of the present invention exhibits its effect if it is substantially non-magnetic, but even if it contains a small amount of a magnetic substance as an impurity or intentionally, if the effects of the present invention are exhibited the constitution can be considered to be substantially the same as that of the magnetic recording medium of the present invention. 'Substantially the same' referred to here means that the non-magnetic layer has a residual magnetic flux density of 10 T·m (100 G) or less or a coercive force of 7.96 kA/m (100 Oe) or less, and preferably has no residual magnetic flux density and no coercive force.

VII. Production Method

A process for producing a magnetic layer coating solution for the magnetic recording medium used in the present invention comprises at least a kneading step, a dispersing step and, optionally, a blending step that is carried out prior to and/or subsequent to the above-mentioned steps. Each of these steps may be composed of two or more separate stages. All materials, including the ferromagnetic hexagonal ferrite powder, the ferromagnetic metal powder, the non-magnetic powder, the binder, the carbon black, the abrasive, the antistatic agent, the lubricant, and the solvent used in the present invention may be added in any step from the beginning or during the course of the step. The addition of each material may be divided across two or more steps. For example, a polyurethane can be divided and added in a kneading step, a dispersing step, and a blending step for adjusting the viscosity after dispersion. To attain the object of the present invention, a conventionally known production technique may be employed as a part of the steps. In the kneading step, it is preferable to use a powerful kneading machine such as an open kneader, a continuous kneader, a pressure kneader, or an extruder. When a kneader is used, all or a part of the binder (preferably 30 wt % or above of the entire binder) and the magnetic powder or the non-magnetic powder are kneaded at 15 to 500 parts by weight relative to 100 parts by weight of the ferromagnetic powder. Details of these kneading treatments are described in JP-A-1-106338 and JP-A-1-79274. For the dispersion of the magnetic layer solution and a non-magnetic layer solution, glass beads may be used. As such glass beads, a dispersing medium having a high specific gravity such as zirconia beads, titania beads, or steel beads is suitably used. An optimal particle size and packing density of these dispersing media is used. A known disperser can be used.

The process for producing the magnetic recording medium of the present invention includes, for example, coating the surface of a moving non-magnetic support with a magnetic layer coating solution so as to give a predetermined coating thickness. A plurality of magnetic layer coating solutions can be applied successively or simultaneously in multilayer coating, and a lower non-magnetic layer coating solution and an upper magnetic layer coating solution can also be applied successively or simultaneously in multilayer coating. As coating equipment for applying the above-mentioned magnetic layer coating solution or the lower non-magnetic layer coating solution, an air doctor coater, a blade coater, a rod coater, an extrusion coater, an air knife coater, a squeegee coater, a dip coater, a reverse roll coater, a transfer roll coater, a gravure coater, a kiss coater, a cast coater, a spray coater, a spin coater, etc. can be used. With regard to these, for example, 'Saishin Kotingu Gijutsu' (Latest Coating Technology) (May 31, 1983) published by Sogo Gijutsu Center can be referred to.

In the case of a magnetic tape, the coated layer of the magnetic layer coating solution is subjected to a magnetic field alignment treatment in which the ferromagnetic powder contained in the coated layer of the magnetic layer coating solution is aligned in the longitudinal direction using a cobalt magnet or a solenoid. In the case of a disk, although sufficient isotropic alignment can sometimes be obtained without using an alignment device, it is preferable to employ a known random alignment device such as, for example, arranging obliquely alternating cobalt magnets or applying an alternating magnetic field with a solenoid. The isotropic alignment referred to here means that, in the case of a fine ferromagnetic metal powder, in general, in-plane two-dimensional random is preferable, but it can be three-dimensional random by introducing a vertical component. In the case of a hexagonal ferrite, in general, it tends to be in-plane and vertical three-dimensional random, but in-plane two-dimensional random is also possible. By using a known method such as magnets having different poles facing each other so as to make vertical alignment, circumferentially isotropic magnetic properties can be introduced. In particular, when carrying out high density recording, vertical alignment is preferable. Furthermore, circumferential alignment may be employed using spin coating.

It is preferable for the drying position for the coating to be controlled by controlling the drying temperature and blowing rate and the coating speed; it is preferable for the coating speed to be 20 to 1,000 m/min and the temperature of drying air to be 60° C. or higher, and an appropriate level of predrying may be carried out prior to entering a magnet zone.

After drying is carried out, the coated layer is subjected to a surface smoothing treatment. The surface smoothing treatment employs, for example, super calender rolls, etc. By carrying out the surface smoothing treatment, cavities formed by removal of the solvent during drying are eliminated, thereby increasing the packing ratio of the ferromagnetic powder in the magnetic layer, and a magnetic recording medium having high electromagnetic conversion characteristics can thus be obtained.

With regard to calendering rolls, rolls of a heat-resistant plastic such as epoxy, polyimide, polyamide, or polyamide-imide are used. It is also possible to carry out a treatment with metal rolls. The magnetic recording medium of the present invention preferably has a surface center plane average roughness in the range of 0.1 to 4.0 nm for a cutoff value of 0.25 mm, and more preferably 0.5 to 3.0 nm, which is extremely smooth. As a method therefor, a magnetic layer formed by selecting a specific ferromagnetic powder and binder as described above is subjected to the above-mentioned calendering treatment. With regard to calendering conditions, the calender roll temperature is preferably in the range of 60° C. to 100° C., more preferably in the range of 70° C. to 100° C., and particularly preferably in the range of 80° C. to 100° C., and the pressure is preferably in the range of 100 to 500 kg/cm, more preferably in the range of 200 to 450 kg/cm, and particularly preferably in the range of 300 to 400 kg/cm.

As thermal shrinkage reducing means, there is a method in which a web is thermally treated while handling it with low tension, and a method (thermal treatment) involving thermal treatment of a tape when it is in a layered configuration such as in bulk or installed in a cassette, and either can be used. In the former method, the effect of the imprint of projections of the surface of the backcoat layer is small, but the thermal shrinkage cannot be greatly reduced. On the other hand, the latter thermal treatment can improve the thermal shrinkage greatly, but when the effect of the imprint of projections of the surface of the backcoat layer is strong, the surface of the magnetic layer is roughened, and this causes the output to decrease and the noise to increase. In particular, a high output and low noise magnetic recording medium can be provided for the magnetic recording medium accompanying the thermal treatment. The magnetic recording medium thus obtained can be cut to a desired size using a cutter, a stamper, etc. before use.

VIII. Physical Properties

The saturation magnetic flux density of the magnetic layer of the magnetic recording medium used in the present invention is preferably 100 to 300 mT (1,000 to 3,000 G). The coercive force (Hc) of the magnetic layer is preferably 143.3 to 318.4 kA/m (1,800 to 4,000 Oe), and more preferably 159.2 to 278.6 kA/m (2,000 to 3,500 Oe). It is preferable for the coercive force distribution to be narrow, and the SFD and SFDr are preferably 0.6 or less, and more preferably 0.2 or less.

The coefficient of friction, with respect to a head, of the magnetic recording medium used in the present invention is preferably 0.5 or less at a temperature of −10° C. to 40° C. and a humidity of 0% to 95%, and more preferably 0.3 or less. The electrostatic potential is preferably −500 V to +500 V. The modulus of elasticity of the magnetic layer at an elongation of 0.5% is preferably 0.98 to 19.6 GPa (100 to 2,000 kg/mm$^2$) in each direction within the plane, and the breaking strength is preferably 98 to 686 MPa (10 to 70 kg/mm$^2$); the modulus of elasticity of the magnetic recording medium is preferably 0.98 to 14.7 GPa (100 to 1,500 kg/mm$^2$) in each direction within the plane, the residual elongation is preferably 0.5% or less, and the thermal shrinkage at any temperature up to and including 100° C. is preferably 1% or less, more preferably 0.5% or less, and most preferably 0.1% or less.

The glass transition temperature of the magnetic layer (the maximum point of the loss modulus in a dynamic viscoelasticity measurement at 110 Hz) is preferably 50° C. to 180° C., and that of the non-magnetic layer is preferably 0° C. to 180° C. The loss modulus is preferably in the range of $1 \times 10^7$ to $8\times10^8$ Pa ($1\times10^8$ to $8\times10^9$ dyne/cm$^2$), and the loss tangent is preferably 0.2 or less. It is preferable if the loss tangent is 0.2 or less, since the problem of tackiness hardly occurs. These thermal properties and mechanical properties are preferably substantially identical to within 10% in each direction in the plane of the medium.

Residual solvent in the magnetic layer is preferably 100 mg/m$^2$ or less, and more preferably 10 mg/m$^2$ or less. The porosity of the coating layer is preferably 30 vol % or less for both the non-magnetic layer and the magnetic layer, and more preferably 20 vol % or less. In order to achieve a high output, the porosity is preferably small, but there are cases in which a certain value should be maintained depending on the intended purpose. For example, in the case of disk media where repetitive use is considered to be important, a large porosity is often preferable from the point of view of storage stability.

The center plane surface roughness Ra of the magnetic layer is preferably 4.0 nm or less, more preferably 3.0 nm or less, and yet more preferably 2.0 nm or less, when measured using a TOPO-3D with the Mirau method. The maximum height $SR_{max}$ of the magnetic layer is preferably 0.5 μm or less, the ten-point average roughness SRz is 0.3 μm or less, the center plane peak height SRp is 0.3 μm or less, the center plane valley depth SRv is 0.3 μm or less, the center plane area factor SSr is 20% to 80%, and the average wavelength Sλa is 5 to 300 μm. It is possible to set the number of surface projections on the magnetic layer having a size of 0.01 to 1 μm at any level in the range of 0 to 2,000 projections per 100 μm$^2$, and by so doing the electromagnetic conversion characteristics and the coefficient of friction can be optimized, which is preferable. They can be controlled easily by controlling the surface properties of the support by means of a filler, the particle size and the amount of a powder added to the magnetic layer, and the shape of the roll surface in the calendering process. The curl is preferably within ±3 mm.

When the magnetic recording medium of the present invention has a non-magnetic layer and a magnetic layer, it can easily be anticipated that the physical properties of the non-magnetic layer and the magnetic layer can be varied according to the intended purpose. For example, the elastic modulus of the magnetic layer can be made high, thereby improving the storage stability, and at the same time the elastic modulus of the non-magnetic layer can be made lower than that of the magnetic layer, thereby improving the head contact of the magnetic recording medium.

A head used for playback of signals recorded magnetically on the magnetic recording medium of the present invention is not particularly limited, but an MR head is preferably used. When an MR head is used for playback of the magnetic recording medium of the present invention, the MR head is not particularly limited and, for example, a GMR head or a TMR head may be used. A head used for magnetic recording is not particularly limited, but it is preferable for the saturation magnetization to be 1.0 T or more, and more preferably 1.5 T or more.

The present invention employs, above the non-magnetic support, as a radiation curing compound a radiation curing urethane acrylate or urethane methacrylate compound, etc. obtained from a diisocyanate not having a cyclic structure but having a branched structure, for example an alkyl branched side chain, such as a methyl branch, an ethyl branch, or a butyl branch. Due to the branched structure, compared with a straight chain aliphatic compound not having a branched structure there is little crystallization, due to the radiation curing compound having low viscosity leveling properties when coating are excellent, micro projections on the support can be buried, and a magnetic layer having excellent smoothness can be obtained, thus giving high electromagnetic conversion characteristics.

Furthermore, since the radiation curing compound used in the present invention has a radiation curing functional group in the molecule, the curability is excellent, and a higher crosslinking density can be obtained. As a result, it is possible to suppress precipitation of unreacted monomer component on the surface of the magnetic layer during long-term storage, and suppress degradation in transport durability due to long-term storage.

Moreover, it is possible to carry out curing with a low absorbed dose. It is surmised that this is due to high motility of the compound in the coating because of the absence of a cyclic structure.

EXAMPLES

The present invention is explained more specifically below by reference to Examples, but the present invention should not be construed as being limited thereby. 'Parts' in the Examples means 'parts by weight' unless otherwise specified.

Synthetic Example of Radiation Curing Compound

In a vessel equipped with a reflux condenser and a stirrer, a compound A shown in Table 1 was dissolved in methyl ethyl ketone at 60° C. under a flow of nitrogen gas to give a 70% solution. Subsequently, 60 ppm of dibutyltin dilaurate and 200 ppm of methoxyhydroquinone relative to the compound A were added thereto and dissolved for 5 minutes. Furthermore, 2 mol of a compound B shown in Table 1 was added relative to 1 mol of the compound A, and a reaction was carried out by heating at 80° C. for 6 hours to give a radiation curing compound solution a to h.

The trimethylhexamethylene diisocyanate used was a 1:1 mixture of 2,2,4-trimethylhexamethylene diisocyanate and 2,4,4-trimethylhexamethylene diisocyanate.

The radiation curing compound solution thus obtained was analyzed using FTIR, and it was confirmed that the acryloyl group had not disappeared.

TABLE 1

| Radiation curing compound | Compound A | Compound B |
|---|---|---|
| a | Lysine diisocyanate methyl ester | 2-Hydroxyethyl acrylate |
| b | Trimethylhexamethylene diisocyanate | 2-Hydroxyethyl acrylate |
| c | Urethane prepolymer A | 2-Hydroxyethyl acrylate |
| d | Urethane prepolymer B | 2-Isocyanate ethyl acrylate |
| e | Trimethylhexamethylene diisocyanate | Pentaerythritol triacrylate |
| f | Hexamethylene diisocyanate | 2-Hydroxyethyl acrylate |
| g | Nonane diisocyanate | 2-Hydroxyethyl acrylate |
| h | Urethane prepolymer C | 2-Hydroxyethyl acrylate |
| I | Urethane prepolymer D | 2-Isocyanate ethyl acrylate |
| J | Hexamethylene diisocyanate | Pentaerythritol triacrylate |

Urethane prepolymer A: Terminal NCO prepolymer of neopentyl glycol/trimethylhexamethylene diisocyanate = 1/2 mol reaction product
Urethane prepolymer B: Terminal OH prepolymer of neopentyl glycol/trimethylhexamethylene diisocyanate = 2/1 mol reaction product
Urethane prepolymer C: Terminal NCO prepolymer of neopentyl glycol/hexamethylene diisocyanate = 1/2 mol reaction product
Urethane prepolymer D: Terminal OH prepolymer of neopentyl glycol/hexamethylene diisocyanate = 2/1 mol reaction product

Example 1

Preparation of Magnetic Layer Coating Solution 100 parts of an acicular ferromagnetic alloy powder (Hc 175 kA/m (2,200 Oe); BET surface area ($S_{BET}$) 70 m$^2$/g; major axis length 45 nm; acicular ratio 4; σs 125 A·m$^2$/kg (emu/g)) was ground in an open kneader for 10 minutes, and then kneaded for 60 minutes with 10 parts (solids content) of an SO$_3$Na-containing polyurethane solution (solids content 30%; SO$_3$Na content 70 μeq/g; weight-average molecular weight 80,000) and 30 parts of cyclohexanone.

Subsequently,
| | |
|---|---|
| an abrasive (Al$_2$O$_3$, particle size 0.3 μm) | 2 parts |
| carbon black (particle size 40 nm) | 2 parts, and |
| methyl ethyl ketone/toluene = 1/1 | 200 parts | were added, and the mixture was dispersed in a sand mill for 120 minutes. To this were added

| | |
|---|---|
| butyl stearate | 2 parts |
| stearic acid | 1 part, and |
| methyl ethyl ketone (MEK) | 50 parts, | and after stirring the mixture for a further 20 minutes, it was filtered using a filter having an average pore size of 1 μm to give a magnetic coating solution.

Preparation of Non-Magnetic Layer Coating Solution 100 parts of α-Fe$_2$O$_3$ (average particle size 0.15 μm; $S_{BET}$ 52 m$^2$/g; surface treatment with Al$_2$O$_3$ and SiO$_2$; pH 6.5 to 8.0) was ground in an open kneader for 10 minutes, and then kneaded for 60 minutes with 15 parts (solids content) of an SO$_3$Na-containing polyurethane solution (solids content 30%; SO$_3$Na content 70 μeq/g; weight-average molecular weight 80,000) and 30 parts of cyclohexanone.

Subsequently,
| | |
|---|---|
| methyl ethyl ketone/cyclohexanone = 6/4 | 200 parts | was added, and the mixture was dispersed in a sand mill for 120 minutes. To this were added

| | |
|---|---|
| butyl stearate | 2 parts |
| stearic acid | 1 part, and |
| methyl ethyl ketone | 50 parts, | and after stirring the mixture for a further 20 minutes, it was filtered using a filter having an average pore size of 1 μm to give a non-magnetic layer coating solution.

The surface of a 7 μm thick polyethylene terephthalate support having a center average surface roughness Ra of 6.2 nm was coated by means of a wire-wound bar with a 15 wt % solution (dilute MEK solution) of Compound a shown in Table 2 as the radiation curing compound for the radiation-cured layer, so that the dry thickness would be 0.5 μm. After drying, the coated surface was cured by irradiation with an electron beam at an acceleration voltage of 125 kV so as to give an absorbed dose of 3 Mrad.

Subsequently, using reverse roll simultaneous multilayer coating, the non-magnetic coating solution was applied on top of the radiation-cured layer and the magnetic coating solution was applied on top of the non-magnetic coating solution so that the dry thicknesses would be 1.5 μm and 0.1 μm respectively. Before the magnetic coating solution had dried, it was subjected to magnetic field alignment using a 5,000 G Co magnet and a 4,000 G solenoid magnet, the solvent was dried off, and the coating was then subjected to a calender treatment employing a metal roll-metal roll-metal roll-metal roll-metal roll-metal roll-metal roll combination (speed 100 m/min, line pressure 300 kg/cm, temperature 90° C.) and then slit to a width of ½ inch to give a magnetic tape.

Examples 2 to 7, Comparative Examples 1 to 7

The procedure of Example 1 was repeated except that the radiation curing compound and a magnetic substance were changed to those shown in Table 2. As a tabular ferromagnetic powder, a ferromagnetic hexagonal barium ferrite powder was used.

TABLE 2

| | Radiation curing compound | Magnetic substance | Electromagnetic conversion characteristics (dB) | Smoothness (nm) | Coefficient of friction | Storage stability Tackiness |
|---|---|---|---|---|---|---|
| Example 1 | a | Acicular ferromagnetic powder (major axis length 45 nm) | 0.8 | 2.6 | 1.2 | Excellent |
| Example 2 | b | Acicular ferromagnetic powder (major axis length 45 nm) | 1.2 | 2.3 | 1.1 | Excellent |
| Example 3 | c | Acicular ferromagnetic powder (major axis length 45 nm) | 1.2 | 2.3 | 1.2 | Excellent |
| Example 4 | d | Acicular ferromagnetic powder (major axis length 45 nm) | 1.1 | 2.4 | 1.1 | Excellent |
| Example 5 | e | Acicular ferromagnetic powder (major axis length 45 nm) | 1.1 | 2.5 | 1.2 | Excellent |
| Example 6 | b | Tabular magnetic substance (plate size 25 nm) | 1.2 | 2.2 | 1.2 | Excellent |
| Example 7 | c | Tabular magnetic substance (plate size 25 nm) | 1.1 | 2.4 | 1.3 | Excellent |
| Comp. Ex. 1 | f | Acicular ferromagnetic powder (major axis length 45 nm) | 0 | 3.2 | 2.4 | Good |
| Comp. Ex. 2 | g | Acicular ferromagnetic powder (major axis length 45 nm) | −0.2 | 3.8 | 2.8 | Poor |
| Comp. Ex. 3 | h | Acicular ferromagnetic powder (major axis length 45 nm) | 0.1 | 3.1 | 2.1 | Poor |
| Comp. Ex. 4 | i | Acicular ferromagnetic powder (major axis length 45 nm) | −0.5 | 3.6 | 2.6 | Poor |
| Comp. Ex. 5 | j | Acicular ferromagnetic powder (major axis length 45 nm) | −0.1 | 3.3 | 1.8 | Good |
| Comp. Ex. 6 | f | Tabular magnetic substance (plate size 25 nm) | 0.1 | 3.2 | 2.5 | Good |
| Comp. Ex. 7 | g | Tabular magnetic substance (plate size 25 nm) | 0.2 | 3.2 | 2.1 | Good |

Measurement methods were as follows.

(1) Storage Stability

Coefficient of Friction

A tape was stored in an environment of 60° C. for 1 week while wound in a reel, the coefficients of friction of the surface of a magnetic layer before and after storage were measured under the conditions below, and the coefficient of friction after storage was expressed as a relative value when the coefficient of friction before storage was 1.

Measurement of the coefficient of friction was carried out by sliding repeatedly for 10 passes at 14 mm/sec in an environment of 23° C. and 70% RH while the surface of the magnetic layer was made to contact an SUS420 member with a load of 50 g, and the coefficient of friction during the tenth pass was measured.

Tackiness

The occurrence of tackiness when a tape was unwound after having been stored in an environment of 60° C. for one week was examined and evaluated using the ranking below.
Poor . . . stuck and could not be unwound.
Good . . . could be unwound but had a tendency to stick.
Excellent . . . did not stick and could be unwound.

(2) Smoothness

An average roughness Ra within 10 μm square (100 μm$^2$) was measured using a Nanoscope III (AFM: atomic force microscope) manufactured by Digital Instruments with a four-sided pyramidal SiN probe having a tip angle of 70°.

(3) Electromagnetic Conversion Characteristics

Measurement was carried out by mounting a recording head (MIG gap 0.15 μm, 1.8 T) and an MR playback head on a drum tester.

The playback output was measured at a speed of the medium relative to the head of 1 to 3 m/min and a surface recording density of 0.57 Gbit/(inch)$^2$ and expressed as a relative value where the playback output of Comparative Example 1 was 0 dB.

As is clear from Table 2, the magnetic recording medium of the present invention could suppress an increase in the coefficient of friction and the occurrence of tackiness due to storage. Furthermore, the electromagnetic conversion characteristics improved.

What is claimed is:

1. A magnetic recording medium comprising:
   a non-magnetic support and, in order thereabove;
   a radiation-cured layer cured by exposing a layer comprising a radiation curing compound to radiation; and
   a magnetic layer comprising a ferromagnetic powder dispersed in a binder,
   the radiation curing compound having a radiation curing functional group in the molecule and being derived from a diisocyanate that has a branched structure but does not have a cyclic structure.

2. The magnetic recording medium according to claim 1, wherein the magnetic recording medium comprises, between the radiation-cured layer and the magnetic layer, a non-magnetic layer comprising a non-magnetic powder dispersed in a binder.

3. The magnetic recording medium according to claim 1, wherein the diisocyanate having a branched structure but not having a cyclic structure is trimethylhexamethylene diisocyanate.

4. The magnetic recording medium according to claim 1, wherein the ferromagnetic powder is an acicular ferromagnetic powder having a major axis length of 20 to 70 nm or a tabular ferromagnetic powder having a plate size of 10 to 50 nm.

5. The magnetic recording medium according to claim 1, wherein the diisocyanate having a branched structure but not having a cyclic structure is lysine diisocyanate methyl ester.

6. The magnetic recording medium according to claim 1, wherein the radiation curing compound is a compound obtained by reacting the diisocyanate having a branched structure but not having a cyclic structure with a compound having in the molecule a group that reacts with an isocyanate group and a radiation curing functional group.

7. The magnetic recording medium according to claim 1, wherein the radiation curing compound is a compound obtained by reacting, with a terminal isocyanate group urethane prepolymer obtained by reacting the diisocyanate having a branched structure but not having a cyclic structure with a diol, a compound having in the molecule a hydroxyl group and a radiation curing functional group.

8. The magnetic recording medium according to claim 1, wherein the radiation curing compound is a compound obtained by reacting, with a terminal hydroxyl group urethane prepolymer obtained by reacting the diisocyanate having a branched structure but not having a cyclic structure with a diol, a compound having in the molecule an isocyanate group and a radiation curing functional group.

9. The magnetic recording medium according to claim 1, wherein the radiation curing functional group is an acryloyl group.

10. The magnetic recording medium according to claim 1, wherein the number of radiation curing functional groups is 2 to 6 per molecule.

11. The magnetic recording medium according to claim 1, wherein the radiation-cured layer has a thickness of 0.1 to 1.0 μm.

12. The magnetic recording medium according to claim 1, wherein the magnetic layer has a thickness of 0.01 to 0.12 μm.

13. The magnetic recording medium according to claim 2, wherein the non-magnetic layer has a thickness of 0.2 to 3.0 μm.

* * * * *